United States Patent [19]

Atsumi et al.

[11] Patent Number: 5,134,267
[45] Date of Patent: Jul. 28, 1992

[54] METHOD OF CONDUCTING CIRCUMFERENTIAL WELDING OF ELECTRIC WELDED STEEL LINE PIPE TO BE LAID BY REEL BARGE

[75] Inventors: Takuya Atsumi; Katsuomi Tamaki, both of Chiba, Japan

[73] Assignee: Kawasaki Steel Corporation, Kobe, Japan

[21] Appl. No.: 546,243

[22] Filed: Jun. 29, 1990

[30] Foreign Application Priority Data

Jul. 6, 1989 [JP] Japan .................. 1-172930
Jul. 6, 1989 [JP] Japan .................. 1-172931
Nov. 29, 1989 [JP] Japan .................. 1-307610

[51] Int. Cl.$^5$ .................................... B23K 9/00
[52] U.S. Cl. ........................ 219/61; 219/137 WM
[58] Field of Search ............ 219/61, 76.12, 60 R, 219/137 WM

[56] References Cited

U.S. PATENT DOCUMENTS 4,020,312 4/1977 Araki et al. .................. 219/61
4,320,277 3/1982 Taira et al. .................. 219/61

FOREIGN PATENT DOCUMENTS 63-30174 2/1988 Japan .................. 219/61

*Primary Examiner*—Clifford C. Shaw
*Attorney, Agent, or Firm*—Dvorak and Traub

[57] ABSTRACT

A method of conducting circumferential welding on electric welded steel pipes to form a continuous line pipe to be laid on the sea bottom by a reel barge method. The formation of the final welding layer is executed with a welding material having a strength which is 5 kg/mm$^2$ or more lower than that of the welding material used for forming the welding layers underlying the final layer. Preferably, the reinforcement of weld is formed to meet the conditions of:

2 mm ≦ radius of curvature at the toe of weld
120° ≦ angle of toe of weld
0.8 mm ≦ height of reinforcement of weld ≦ 1.8 mm Preferably, the electric welded pipes as the base metal has the composition: containing C: 0.03 to 0.20 wt %; Mn: 0.50 to 1.5 wt %; Si: 0.05 to 0.50 wt %; Al: 0.005 to 0.060 wt %; Nb, V and Ti in total: not greater than 0.040 wt %; and the balance substantially Fe and incidental impurities, Preferably, the carbon equivalent Ceq and the weld cracking sensitivity Pcm, satisfy the following conditions of:

$0.20 \leq Ceq \leq 0.36$ $Pcm \leq 0.25$.

5 Claims, 7 Drawing Sheets

METHOD OF CONDUCTING CIRCUMFERENTIAL WELDING OF ELECTRIC WELDED STEEL LINE PIPE TO BE LAID BY REEL BARGE

BACKGROUND OF THE INVENTION

1. Field of the Invention

The present invention relates to a method of conducting circumferential welding of an electric welded steel line pipe which is suitable to be laid by a reel barge.

2. Description of the Related Art

In one prior art this method, successive pipe modules are connected by circumferential welding conducted by manual welding, MIG (Metal Inert Gas) welding or MAG (Metal Active Gas) welding on a barge 1, and the continuous pipe composed of welded pipe segments is fed from the barge so as to be laid on the sea bottom. According to this method, however, it is necessary to conduct various operations on the barge, such as welding, inspection of the welded parts, coating and so forth. In general, such operations could not be conducted at high efficiency because only limited working space is available on the barge, and because the work on the barge is seriously influenced by weather and the condition of the sea.

In order to obviate these problems, a method called "reel barge method" is becoming popular. According to this method, circumferential welding of pipe modules, inspection and coating are conducted on shore so as to form a long continuous pipe. The thus formed long continuous pipe is wound on a reel mounted on the barge. After the barge has arrived at the place where the pipe is to be laid, the continuous pipe is unwound from the reel and laid on the sea bottom.

By using the reel barge method, it is possible to lay a submarine line pipe at a very high efficiency. This method, however, suffers from a problem in that tensile and compression stresses are generated in parts of the pipe when the pipe is wound on the reel or unwound from the reel so as to be laid on the sea bottom, tending to cause generation of cracks in the toe portion of the circumferential welded part of the base metal of the pipe.

Hitherto, seamless pipes have been used as the line pipes to be laid on the sea bottom, in view of the quality and strength. In recent years, however, attempts have been made to use electric welded steel pipes in place of seamless pipes, partly because the quality of electric welded pipes has been improved remarkably and partly because the use of this type of pipes is advantageous from an economical point of view.

Unfortunately, prevention of toe cracking in the circumferential weld portion is more difficult with the case of electric welded steel pipes than with the case of seamless pipes, for the following reason.

Namely, an electric welded steel pipe is usually formed from a steel sheet which undergoes a controlled rolling for attaining high strength and toughness. However, during the circumferential welding, the weld region is heated to a temperature above the $AC_3$ transformation point to lose the effect of the controlled rolling, with the result that the heat affected zone is softened to a level below the hardness of the base metal, tending to exhibit a toe cracking.

Hitherto, various methods have been proposed to improve the toughness of the weld portions, such as those disclosed in Japanese Examined Patent Publication No. 60-31888 which teaches a post heat treatment after the welding while controlling the carbon equivalent of the base metal, and Japanese Unexamined Patent Publication No. 53-12751 which shows an application of supersonic vibration to the welded material during the welding. The method proposed in Japanese Examined Patent Publication No. 60-31888 requires the post heat treatment as an additional step. The method proposed in Japanese Unexamined Patent Publication No. 53-12751 requires that a separate device be provided for imparting vibration, as well as a difficult procedure for adjusting the vibration frequency since application of vibration at an inadequate vibration frequency tends to impair the toughness rather than improving the toughness.

SUMMARY OF THE INVENTION

Accordingly, an object of the present invention is to provide a circumferential welding method for steel pipes to be laid by a reel barge, improved to prevent generation of cracking at the circumferential weld portion of the pipe.

The present inventors have conducted an intense study on application of electric welded steel pipes to the reel barge method, and found that the generation of cracks at the toe of the circumferential welded portion can effectively be avoided by suitably limiting the ranges of factors such as the strength of the weld metal, and shape of the reinforcement of weld and the components of the line pipe.

Thus, according to the present invention, there is provided a method of conducting circumferential welding on electric welded steel pipes to form a continuous line pipe to be laid by the reel barge method, the method comprising: using, for the formation of the final welding layer, a welding material having a strength which is 5 kg/mm² or more lower than that of the welding material used for forming the welding layers underlying the final layer.

The above and other objects, features and advantages of the present invention will become clear from the following description of the preferred embodiments when the same is read in conjunction with the accompanying drawings.

DESCRIPTION OF THE PREFERRED EMBODIMENTS

Figure 8:
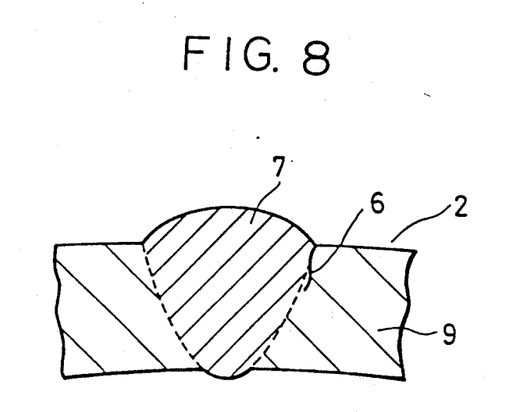
FIG. 8 is a sectional view of a weld portion illustrating a typical example of cracking appearing at the toe of weld.
Figure 9:
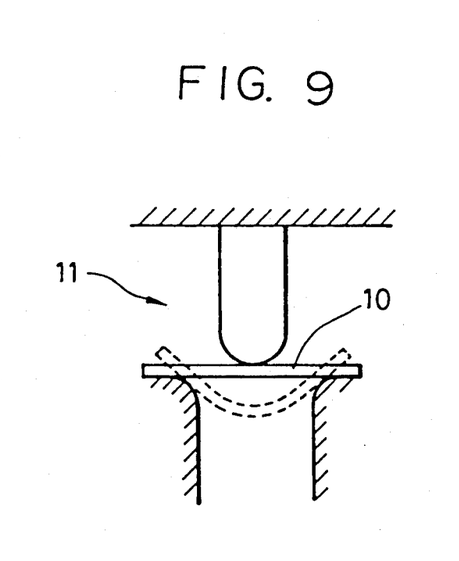
FIG. 9 is an illustration of the repeated bending test.

Using a bending tester 11 as shown in FIG. 9, the present inventors conducted a repeated bending test (strain 5%) on test pieces 10 extracted from the circumferential weld portion of an electric welded line pipe, in accordance with API 1104, in order to examine the state of generation of cracks in the toe of weld. The inventors confirmed that cracks 6 typically shown in FIG. 8 were generated in the toes of the weld 7 of the test pieces. It was also confirmed that a greater cracking tendency is observed when there is a large difference between the hardness of the base metal and the final layer of the weld metal.

Figure 10:
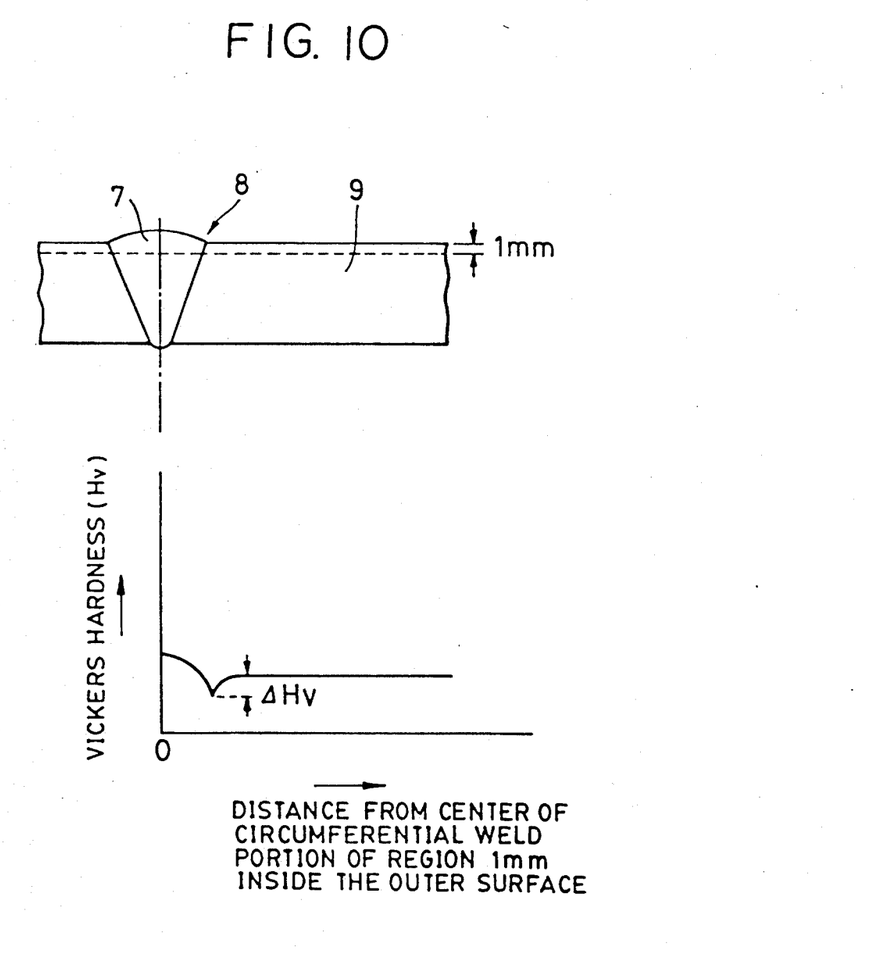
FIG. 10 is a schematic illustration of a hardness distribution of a control-rolled material.
Figure 11:
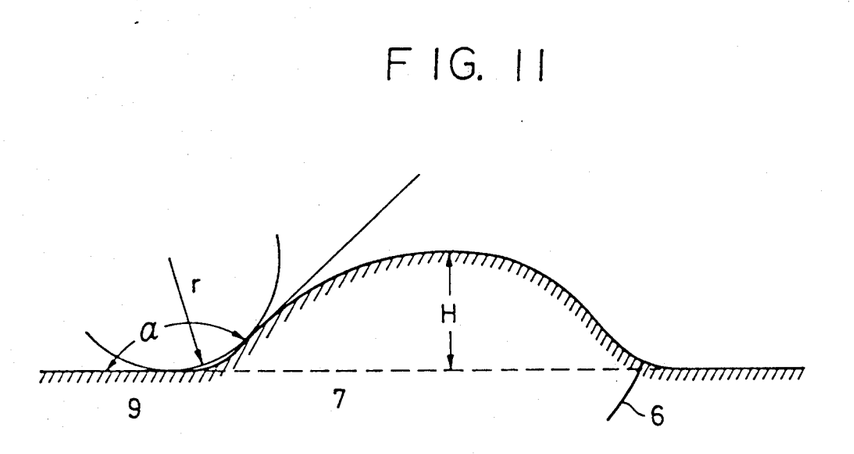
FIG. 11 is an illustration of definition of the height of a reinforcement of weld and radius of curvature and the angle of the toe of weld.

Thus, the cracking is considered to be attributable to the difference in the hardness between the weld metal and the base metal, as will be seen from schematic illustration of hardness distribution shown in FIG. 10. More specifically, it is considered that the cracking is caused by the difference in the amount of plastic deformation between the weld metal and the base metal during winding and unwinding of the pipe. More specifically, the cracking is considered to be attributed to the fact that the plastic deformation of the base metal is restrained by the weld metal which has a greater hardness than the base metal. As shown in FIG. 10, the final layer of the weld metal exhibits a greater hardness than the base metal. This is attributable to the fact that the final layer of the weld metal formed by the final pass is never softened because there is no subsequent pass.

With this knowledge, the present inventors conducted an experiment in which a circumferential welding was conducted by using, as the welding material for the final weld metal layer, a welding material having a strength smaller than the material used for forming the underlying layers. Test pieces extracted from such circumferential weld portion was subjected to a repeated bending test, the results being shown in FIG. 1. It is understood that the rate of generation of cracks is remarkably reduced when a welding material used for the final layer has a strength which is 5 kg/mm² or more lower than that of the welding material used for forming the preceding or underlying weld layers.

The formation of the final welding layer is normally conducted by manual welding, though MIG or MAG welding may be adopted. The welding material is in the form of welding rod. It is preferred to use a cellulose-type welding rod.

Preferably, the welding material for forming the final welding layer has a strength which is at least 15 kg/mm² lower than that of the welding material used for forming the preceding or underlying layers, from the view point of strength of the coupling.

According to the invention, the configuration of the reinforcement of weld on the circumferential weld portion is determined to meet the following conditions.

2mm ≦ radius of curvature at the toe of weld
120° ≦ angle of toe of weld
0.8mm ≦ height of reinforcement of weld ≦ 1.8 mm A description will be given of the reasons of the above-mentioned numerical limitations.

Figure 1:
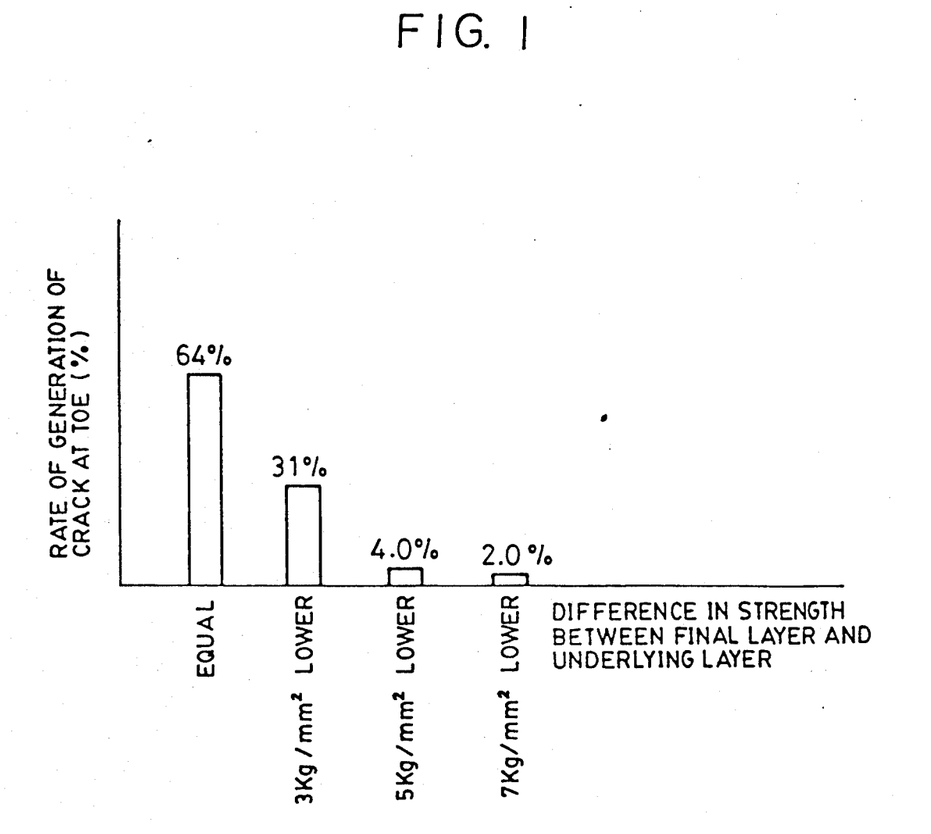
FIG. 1 is a characteristic chart showing the results of a repeated bending test.

FIG. 1 illustrates a reinforcement of weld for the purpose of defining the height H of the reinforcement of weld and the radius of curvature r and the angle $\alpha$ of the toe of weld. The inventors have found that increase in the height H of reinforcement increases the rate of generation of crack 6 at the toe of weld, and that, when the height H is the same, the rate of generation of crack is greater when the radius r of curvature or the angle $\alpha$ is smaller. It was discovered that the cracking can effectively be avoided by suitably selecting the ranges of these three factors.

The above-mentioned cracking is attributable to discontinuity of the shape at the weld joint. Particularly, it is considered that the crack at the toe of weld is caused as a result of concentration of tensile and compression stresses to the toe portion, i.e., the toe of weld during winding and rewinding of the pipe. The distribution of the stresses in the weld portion is complicated due to a drastic change in the geometrical configuration of the weld portion, so that the stresses are concentrated to the toe portion to cause cracking in this portion.

With this knowledge, the present inventors have conducted tests of circumferential welding while varying the above-mentioned factors of the reinforcement of weld and conducting bending test under the same conditions as those described before, in order to find conditions which are to be met in order to achieve the aforesaid object of the present invention. As a result, the inventors have found that the following conditions (1) to (3) have to be met in order that the object of the present invention is achieved.

(1) The radius r of toe of weld must be smaller than 2 mm

Figure 2:
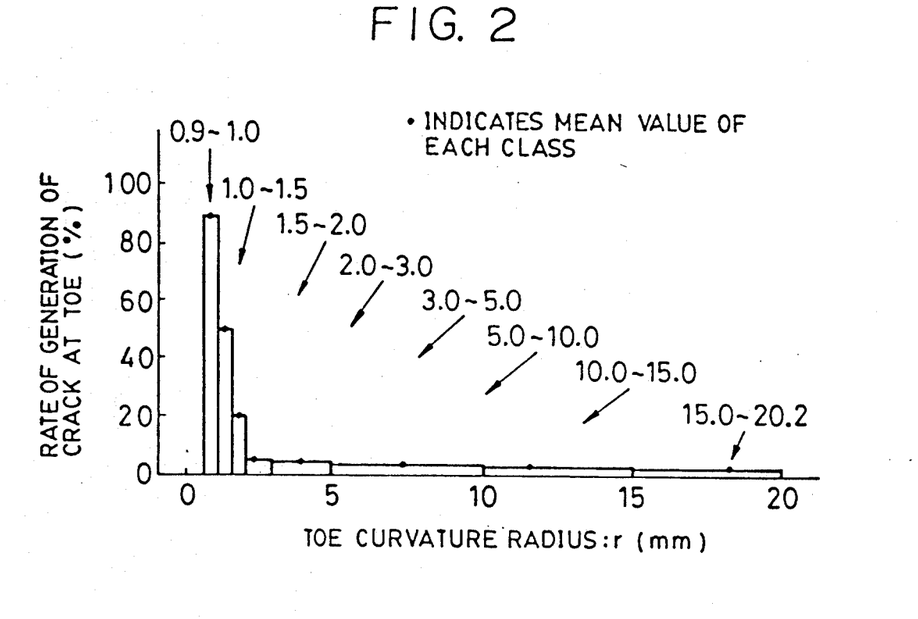
FIG. 2 is a characteristic chart showing the relationship between the radius of curvature of the toe of weld and rate of generation of toe cracking.

FIG. 2 illustrates the relationship between the radius r of curvature of the toe of weld and the rate of generation of cracking at the toe. More specifically, this figure shows rates of generation of cracks at the toes at various radii r of curvature of the toe of weld, examined under conditions where the height H of the reinforcement is 0.8 to 1.8 mm and the angle u at the toe of weld is 120° to 150°.

FIG. 2 clearly shows a qualitative tendency that the rate of generation of crack at the toe is largely influenced by the radius of curvature of the toe of weld. Referring to FIG. 2, from a quantitative point of view, the curvature at the toe of weld has an appreciable effect in preventing cracking when the radius is 1 mm or greater and a satisfactory result is obtained when the radius is 2 mm or greater. Improvement in the crack prevention effect is still possible by increasing the radius of curvature beyond 10 mm. Such a large radius of curvature at the toe of weld, however, requires an impractically large bevel angle, which makes the welding unstable to cause various welding defects, thus leading to a greater tendency of cracking at the weld portion. From a practical point of view, therefore, it is not recommended to increase the radius r of curvature beyond 10 mm. It is therefore preferred that the radius r of curvature of the toe of weld is not smaller than 2 mm and not greater than 10 mm.

(2) The angle of the toe of weld should be greater than 120°

Figure 3:
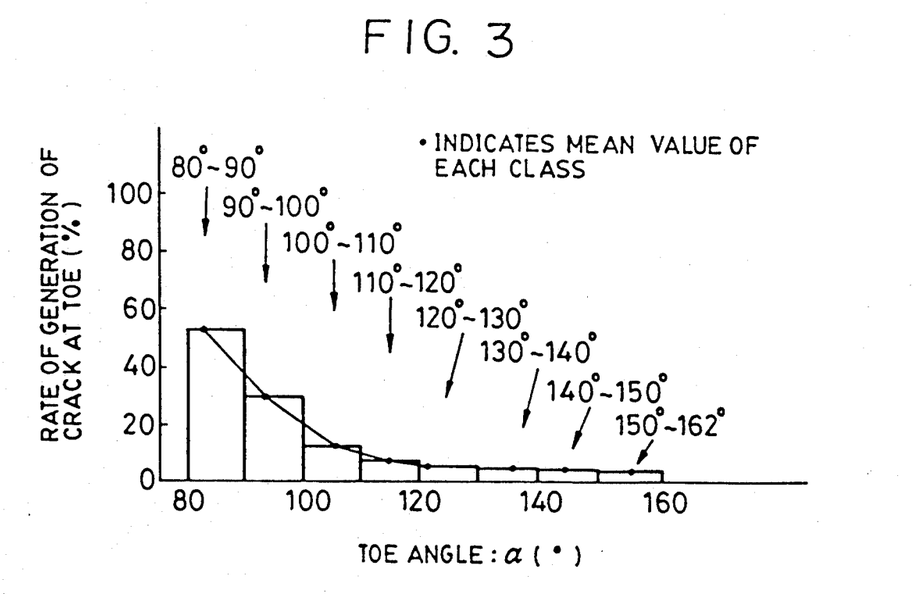
FIG. 3 is a characteristic chart showing the relationship between the angle of the toe of weld and the rate of generation of toe cracking.

FIG. 3 illustrates the relationship between the angle $\alpha$ of the toe of weld and the rate of generation of cracking at the toe. More specifically, this figure shows rates of generation of cracks at the toes at various values of the angle α at the toe of weld, examined under conditions where the height H of the reinforcement is 0.8 to 1.8 mm and the radius r of curvature at the toe of weld is 2 to 10 mm.

FIG. 3 clearly shows a qualitative tendency that the rate of generation of crack at the toe is largely influenced by the angle u at the toe of weld. Referring to FIG. 3, from a quantitative point of view, the angle at the toe of weld has an appreciable effect in preventing cracking at the toe when the angle is 100° or greater and a satisfactory result is obtained when the angle is 150° or greater. Improvement in the crack prevention effect is still possible by increasing the angle beyond 150°. Such a large angle at the toe of weld, however, requires an impractically large bevel angle, which makes the welding unstable to cause various welding defects, thus leading to a greater tendency of cracking at the weld portion, as is the case of the condition (1) described above. From a practical point of view, therefore, it is not recommended to increase the angle α beyond 150°. It is therefore preferred that the angle α at the toe of weld is from 120° to 150°.

(3) The height of the reinforcement of weld should be not smaller than 0.8 mm but not greater than 1.8 mm.

Figure 4:
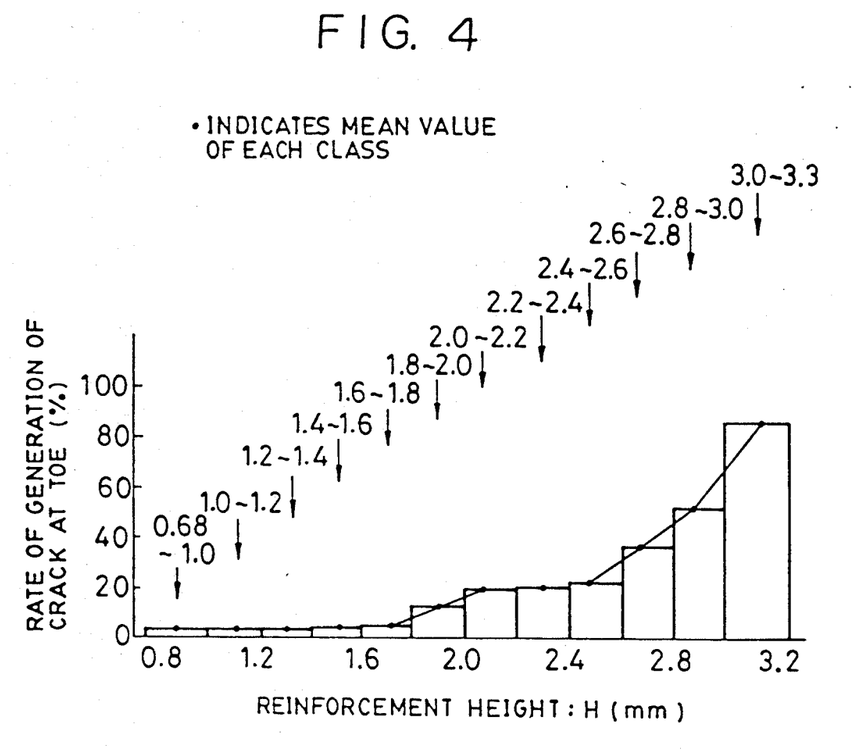
FIG. 4 is a characteristic chart showing the relationship between the height of a reinforcement of weld and rate of generation of toe cracking.

FIG. 4 illustrates the relationship between the height H of the reinforcement of weld and the rate of generation of cracking at the toe. More specifically, this figure shows rates of generation of cracks at the toes at various values of the height H of the reinforcement of weld, examined under conditions where the radius r of curvature at the toe of weld is 2 to 10 mm and the angle α at the toe of weld is 120° to 150°.

FIG. 4 clearly shows a qualitative tendency that the rate of generation of crack at the toe is largely influenced by the height H of the reinforcement of weld. Referring to FIG. 4, from a quantitative point of view, the crack prevention effect becomes appreciable when the height of the reinforcement of weld is 2.6 mm or less and is satisfactory when the height is 1.8 mm or smaller. Improvement in the crack prevention effect is still obtainable when the height of the reinforcement of the weld is reduced to a level below 0.8 mm but such a small height is not preferred because the strength of the weld joint is reduced to increase the risk for the joint to be ruptured. For these reasons, it is preferred that the height of the reinforcement of the weld ranges between 0.8 and 1.8 mm.

The above-described requirements concerning the strength of the welding material used for the final layer and the configuration of the weld portion are applicable also to seamless line pipes or other types of line pipes although electric welded steel pipes have been specifically mentioned in the foregoing description.

The present inventors have found also that the cracking at the toe of a circumferential weld portion is closely related to the softening of the heat affected zone. It has also been confirmed that circumferential welding of line pipe can be conducted without risk of cracking when the following tough electric welded steel pipe, which is not substantially softened by the welding heat, is used as the pipe material to be welded under the above-mentioned conditions for the strength of the welding material used for the final layer and the configuration of the reinforcement of weld.

Composition of the Electric Welded Line Pipe Material

The line pipe to which the circumferential welding method of the present invention is optimumly applied and which is suitable to be laid on the sea bottom by the reel barge method preferably has a composition containing:

C: 0.03 to 0.20 wt%
Mn: 0.50 to 1.5 wt%
Si: 0.05 to 0.50 wt%
Al: 0.005 to 0.060 wt%

Nb, V and Ti in total: not greater than 0.040 wt% and the balance substantially Fe and incidental impurities, wherein the carbon equivalent Ceq and the weld cracking sensitivity Pcm, which are respectively determined by the formulae shown below, satisfy the following conditions of:

$$0.20 \leq Ceq \leq 0.36$$

$$Pcm \leq 0.25$$

$$Ceq = C + Mn/6 + Cu/15 + Ni/15 + Cr/5 + Mo/5 + V/5$$

$$Pcm = C + Si/30 + Mn/20 + Cu/20 + Ni/60 + Cr/20 + Mo/15 + V/10 + 5B$$

The material of the line pipe also may contain:

(a) one, two or more kinds selected from the group consisting of:
Ni: not more than 0.50 wt%
Cu: not more than 0.50 wt%
Ca: not more than 0.005 wt%
Cr: not more than 0.3 wt% and/or
(b) one or both of:
Mo: not more than 0.30 wt%
B: not more than 0.002 wt%

Using a bending tester 11 shown in FIG. 9, the present inventors conducted a repeated bending test (strain 5%) on test pieces 10 extracted from the circumferential weld portion of an electric welded line pipe, in accordance with API 1104, in order to examine the state of generation of cracks in the toe of weld. The inventors confirmed that cracks 6 typically shown in FIG. 8 were generated in the toes of weld 7 of the test pieces. It was also confirmed that a greater cracking tendency is observed when the extent of softening of the heat affected zone is large. It is thus understood that the cracking can effectively be suppressed when the degree of softening of the heat affected zone is reduced.

The cracking is considered to be attributable to the difference in the hardness between the heat affected zone 8 and the base metal 9, as will be seen from schematic illustration of hardness (Hv) distribution shown in FIG. 10. More specifically, it is considered that the cracking is caused by the difference in the amount of plastic deformation between the heat affected zone and the base metal during winding and unwinding of the pipe. In other words, strain is concentrated to the heat affected zone 8 having a softened region so that a local work hardening takes place to cause embrittlement of this zone, thus allowing cracking.

With this knowledge, the present inventors conducted various studies to investigate the degrees of softening ($\Delta Hv$) of the heat affected zone with a variety of component systems, and found that the softening can be remarkably suppressed when a specific component system is used.

Figure 5:
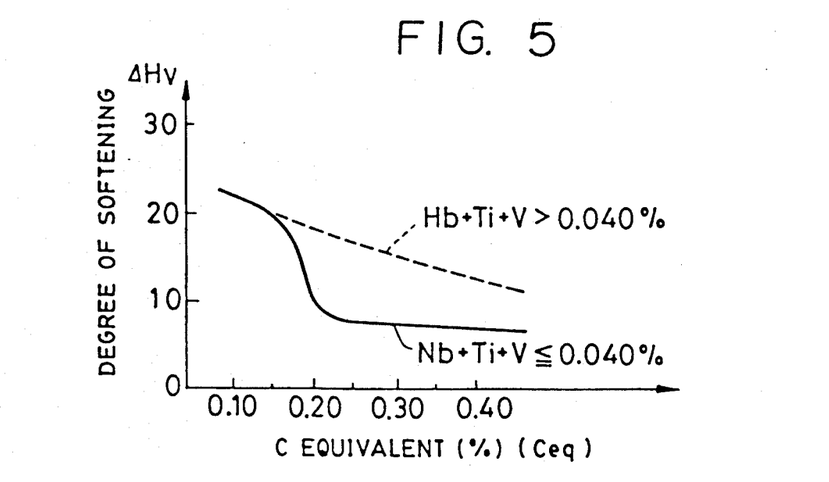
FIG. 5 is a graph showing the relationship between the degree of softening ($\Delta Hv$) and Ceq.
Figures 6, 7A:
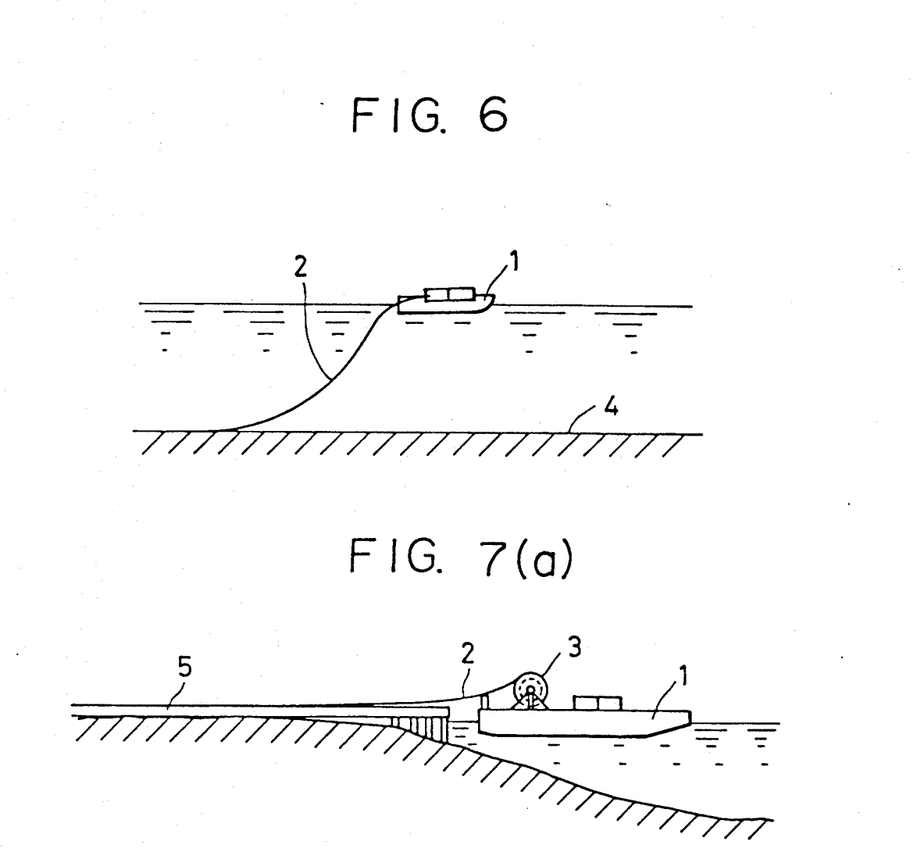
FIG. 6 is an illustration of a prior art method for laying a submarine line pipe.
FIG. 7a is an illustration of a state in which a continuous pipe prepared on shore is being taken up by a reel on a barge on the sea.
Figure 7B:
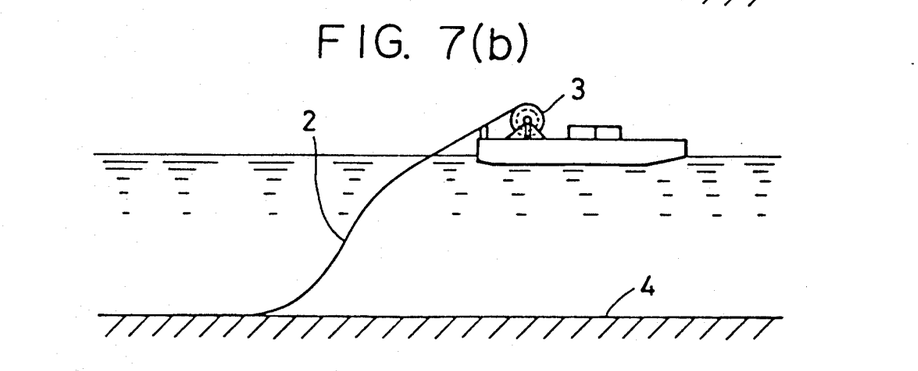
FIG. 7b is an illustration of a state in which the continuous pipe is rewound from the reel and laid on the sea bottom.

More specifically, the inventors have found that a remarkable effect is attained when the total amount of content of Nb, V and Ti and the carbon equivalent Ceq is suitably controlled, as will be seen from FIG. 5. FIG. 5 is a graph showing the relationship between the degree of softening ($\Delta Hv$) and the carbon equivalent Ceq in each of the cases where the total content (Nb +V +Ti) is not more than 0.040 wt% and where this total content is above 0.040 wt%. From a qualitative point of view, it will be seen that the degree of softening ($\Delta Hv$) can be reduced by increasing the carbon equivalent Ceq. From a quantitative point of view, it is understood that the degree of softening ($\Delta Hv$) can be maintained to be 8 or less when the Ceq is 20 wt% or more. When the degree of softening ($\Delta Hv$) is 8 or below, the cracking at the toe of weld was substantially eliminated when the test pieces were tested by the repeated bending test shown in FIG. 9.

The effect produced by the limitation of the total quantity of Nb, V and Ti on the suppression of the softening is considered to be attributable to the following facts. These elements independently or in combination, strengthen the base metal, i.e., enhance the effect of the controlled rolling. Thus, limiting the total amount of these elements serves to reduce the effect of the controlled rolling on the base metal Increase in the carbon equivalent Ceq also contributes to the reduction in the effect of the controlled rolling, thus suppressing the softening. Consequently, the degree of softening caused by the heat applied during the circumferential welding is suppressed to realize a more uniform deformation, thereby contributing to an improvement in the bending ductility.

In order to suppress the softening of the heat affected zone to a level which is practically permissible, it is necessary that the total content (Nb +V +Ti) is not greater than 0.040 wt%. The carbon equivalent Ceq, when its amount is below 0.20 wt%, cannot provide any appreciable effect in suppressing the softening of the heat affected zone. On the other hand, the value of Ceq exceeding 0.36 wt% causes not only a saturation of the effect but also a serious reduction in the toughness. The carbon equivalent Ceq, therefore, should be not smaller than 0.20 wt% and not greater than 0.36 wt%.

Reasons of limitation of contents of other components will be described hereinunder.

For the base metal to exhibit a required strength, C must be contained in an amount not less than 0.03 wt%. Any C content exceeding 0.20 wt%, however, causes an increase in the weld crack sensitivity, so that the C content is determined to be from 0.03 to 0.20 wt%.

Si is an element which serves as a deoxidizer and which provides a strength to the base metal. In order to obtain appreciable effects, Si content should be not less than 0.05 wt%. Si content exceeding 0.50 wt%, however, undesirably causes a reduction in the low-temperature toughness and an increase in the weld cracking sensitivity. The Si content is therefore ideally determined to be from 0.05 to 0.50 wt%.

Mn is an element which provides strength to the base metal. In order to obtain an appreciable effect, Mn content should be 0.50 wt% or more. Mn content exceeding 1.5 wt%, however, undesirably increases the weld cracking sensitivity so as to reduce the bending ductility during laying of the line pipe. For these reasons, the Mn content is ideally determined to range from 0.50 to 1.5 wt%.

Al is a strong deoxidizing element but the effect is not appreciable when the content if below 0.005 wt%. On the other hand, when the Al content exceeds 0.060 wt%, the deoxidizing effect is substantially saturated and, in addition, the total content of nonmetallic inclusions is increased. The Al content is therefore ideally determined to be from 0.005 to 0.060 wt%.

Ni is an element which is effective in improving the strength and HIC characteristic. This element also remarkably improves toughness of both the base metal and the heat affected zone. Addition of Ni in excess of 0.50 wt%, however, causes a generation of heavy scale so as to impair the nature of the surface of the steel sheet. The Ni content, therefore, is ideally 0.50 wt% or less.

Cu forms, particularly under an environment of high pH value, a stable film on the steel surface so as to improve the corrosion resistance, as well as the anti-HIC characteristic. Addition of Cu in excess of 0.50 wt%, however, causes a reduction in the hot workability so that the Cu content is limited to be not more than 0.50 wt%.

Ca is an element which spheroidizes sulfide-type inclusion so as to prevent the sulfide-type inclusion from forming start point of HIC, thereby improving HIC characteristics. Addition of Ca in excess of 0.005 wt%, however, increases the total content of large inclusions, impairing the anti-HIC characteristic and anti-hydrogen swelling characteristic. For these reasons, the Ca content is ideally 0.005 wt% or less.

Cr improves corrosion resistance and resists penetration of hydrogen into the steel, while suppressing reduction in anti-SSC characteristic caused by addition of Ni. Addition of Cr in excess of 0.30 wt% causes a reduction in the toughness of the weld portion, so that ideally the Cr content is to be 0.30 wt% or less.

Both Mo and B are added in order to strengthen the base metal. Addition of Mo in excess of 0.30 wt%, however, causes a saturation of the effect and is uneconomical, while addition of B in an amount greater than 0.002 wt% causes a reduction in the toughness. The Mo content and the B content, therefore, are ideally determined to be 0.30 wt% or less and 0.002 wt% or less, respectively.

Pcm is an index of the welding cracking sensitivity. In the described component system, the welding crack sensitivity is seriously increased when Pcm exceeds 0.25, with the result that the bending ductility of the circumferential weld portion is reduced. The index Pcm, therefore, should ideally be not greater than 0.25.

EXAMPLE 1

An example of the present invention will be described hereinunder.

Line pipe samples of 273.1 mm in outside diameter and 12.7 mm in thickness having compositions shown in Table 1 were prepared These samples were subjected to 6-layer 6-pass circumferential welding conducted by shielded metal arc welding under the conditions shown in Table 2, using different welding rods for each of the samples. Test pieces (n=100) of 12.7 mm thick, 25.4 mm wide and 230 mm long were extracted from the welded samples in such a manner as to include the circumferential weld portions in accordance with API 1104, and the thus obtained test pieces were subjected to a repeated bending test in which the test pieces were bent 10 times at a strain of 5%. The portions of the test pieces around the weld region were checked for cracks. The tensile strength of the welding rod shown in Table 2 was determined in advance of the repeated bending test, in accordance with a method specified by JIS Z 3111 which determines the conditions of tensile test of weld metals formed by welding rods. The rates of generation of cracks in the repeated bending test also are shown in Table 2.

As will be seen from Table 2, almost no cracking was observed in the test samples prepared in accordance with the method of the invention in which the final layers were formed of welding materials which are 5 kg/mm² or more lower than those of the welding materials used for the preceding or underlying layers. In contrast, comparison examples showed large rates of generation of cracks. In particular, it is to be noted that the crack generating rate in Example 2, which employed the same base metal composition B as Comparison Example 1 except that the strength of the final layer was changed, was about 1/77 that exhibited by Comparison Example 1. According to the invention, it is thus possible to improve bending ductility at the weld region. The present invention, therefore, produces a remarkable effect when applied to circumferential welding of electric welded steel pipes for forming a continuous line pipe which is to be laid on the sea bottom by the reel barge method.

Throughout the specification, the term "layer" is used to mean a layer of a weld metal formed by one or more passes, while the term "pass" means one run of welding operation conducted along the weld joint, broadly sorted into single pass and multi-pass.

test pieces were bent 10 times at a strain of 5%, and the portions of the test pieces around the weld region were checked for cracks. Test pieces of the same size as that mentioned above were subjected to a tensile test and the states of rupture were examined. The results of the bending test and the rupture test are shown in Table 4.

Sample Nos. 7 to 10 were prepared such that the height of the reinforcement of weld, angle at the toe of weld and the radius of curvature of the toe of weld meet the conditions as specified by the present invention. As will be seen from Table 4, these samples showed almost no cracking. Comparison example Nos. 1 and 2, which had too large heights of reinforcement of weld, showed large rates of crack generation. Large rates of generation of cracks at toes also were observed in Sample No. 3 in which the all the factors of the height, toe angle and toe radius of curvature did not fall within the ranges specified by the invention, Sample No. 4 having a tool small radius of curvature of toe and Sample No. 5 having a toe angle below the range specified by the invention while meeting the conditions of the invention in the height of reinforcement of weld and radius of curvature of the toe. Sample 6 had a height of the reinforcement of weld smaller than 0.8 mm. In this sample, rupture took place at a portion other than the base metal. In contrast, Sample Nos. 11 and 12 having heights of greater than 0.8 mm showed rupture in the base metals.

It is thus possible to improve bending ductility at the weld region, by determining the height of the reinforcement of weld, toe angle and the toe radius of curvature so as to fall within the ranges specified by the invention.

TABLE 1

| Composition | C | Si | Mn | P | S | Cu | Ni | Cr | Mo | V | Nb |
|---|---|---|---|---|---|---|---|---|---|---|---|
| | | | | | (wt %) | | | | | | |
| A | 0.06 | 0.08 | 0.74 | 0.018 | 0.007 | 0.01 | 0.03 | 0.01 | 0.02 | 0.001 | 0.016 |
| B | 0.06 | 0.14 | 0.73 | 0.018 | 0.007 | 0.01 | 0.02 | 0.03 | 0.04 | — | 0.021 |

TABLE 2

Conditions of circumferential welding and results of bending test (%)

| | Comparison Examples | | | | | Examples of Invention | | | | |
|---|---|---|---|---|---|---|---|---|---|---|
| | No. 1 | No. 2 | No. 3 | No. 4 | No. 5 | No. 1 | No. 2 | No. 3 | No. 4 | No. 5 |
| Welding method | Shielded metal arc welding | | | | | | | | | |
| Welding rod | | | | | | | | | | |
| Final layer | | | | | | | | | | |
| Rod specifications | Cellulose type E7010A1 | | | | | Cellulose type E6010 | | | | |
| Tensile strength (kg/md) | 54.4 | 52.7 | 53.5 | 52.2 | 51.1 | 50.2 | 48.5 | 48.1 | 46.6 | 47.4 |
| Underlying layers | | | | | | | | | | |
| Rod specifications | Cellulose type E7010A1 | | | | | | | | | |
| Tensile strength (kg/md) | 55.1 | 55.7 | 52.9 | 54.0 | 54.6 | 55.2 | 56.3 | 53.1 | 54.4 | 54.0 |
| Difference in ten strength (②−①) (kg/md) | 0.7 | 3.0 | −0.6 | 1.8 | 3.5 | 5.0 | 7.8 | 5.0 | 7.8 | 6.6 |
| Crack generation rate | | | | | | | | | | |
| Composition A | 53 | 28 | 59 | 51 | 22 | 5 | 3 | 4 | 2 | 4 |
| Composition B | 77 | 31 | 77 | 41 | 25 | 4 | 1 | 5 | 3 | 4 |

Base metals are of X56 of specification

EXAMPLE 2

Line pipe samples of 273.1 mm in outside diameter and 12.7 mm in thickness were subjected to a circumferential welding conducted by shielded metal arc welding under the conditions shown in Table 3. Test pieces of 12.7 mm thick, 5.4 mm wide and 230 mm long were extracted from the welded samples in such a manner as to include the circumferential weld portions in accordance with API 1104, and thus obtained test pieces were subjected to a repeated bending test in which the The present invention, therefore, produces a remarkable effect when applied to circumferential welding of electric welded steel pipes for forming a continuous line pipe which is to be laid on the sea bottom by reel barge method.

TABLE 3

| Condition of Circumferential Welding | |
|---|---|
| Base metal | X56 |
| Welding method | Shielded metal arc welding |

TABLE 3-continued

| Condition of Circumferential Welding | |
| --- | --- |
| Base metal | X56 |
| Welding rod | Cellulose type E7010G |
| Number of layers | 6-layer, 6-pass |

TABLE 4

| | No. | | Curvature radius of toe (mm) | Toe angle (°) | Height of reinforcement (mm) | Number (n) of test pieces | Result of tensile test (Rupture) | Crack generation rate (%) |
| --- | --- | --- | --- | --- | --- | --- | --- | --- |
| Comparison Examples | 1 | Mean (M) | 5.5 | 135 | 2.71 | 43 | — | 40 |
| | | Range (R) | 4.2~6.2 | 130~141 | 2.3~3.2 | | | |
| | 2 | M | 4.6 | 138 | 2.12 | 65 | — | 23 |
| | | R | 3.9~5.5 | 131~147 | 1.9~2.3 | | | |
| | 3 | M | 1.2 | 109 | 3.46 | 21 | — | 90 |
| | | R | 0.9~1.5 | 98~119 | 3.0~3.9 | | | |
| | 4 | M | 1.5 | 129 | 1.64 | 99 | — | 49 |
| | | R | 1.3~1.9 | 120~133 | 1.5~1.8 | | | |
| | 5 | M | 4.4 | 98 | 1.77 | 53 | — | 34 |
| | | R | 3.0~5.2 | 83~119 | 1.5~1.8 | | | |
| | 6 | M | 4.4 | 128 | 0.77 | 40 | 5% ruptured at portions other than base metal | — |
| | | R | 3.0~5.2 | 120~136 | 0.70~0.79 | | | |
| Examples of Invention | 7 | M | 4.6 | 132 | 1.11 | 33 | — | 3.0 |
| | | R | 3.1~5.1 | 123~135 | 0.80~1.2 | | | |
| | 8 | M | 4.1 | 131 | 1.36 | 26 | — | 3.8 |
| | | R | 3.3~4.4 | 121~144 | 1.2~1.4 | | | |
| | 9 | M | 4.4 | 136 | 1.56 | 42 | — | 2.4 |
| | | R | 3.2~4.9 | 126~143 | 1.4~1.6 | | | |
| | 10 | M | 3.2 | 128 | 1.68 | 66 | — | 3.0 |
| | | R | 2.0~3.6 | 122~131 | 1.6~1.8 | | | |
| | 11 | M | 3.4 | 127 | 0.84 | 40 | Ruptured at base metal | — |
| | | R | 2.4~3.9 | 121~133 | 0.80~0.90 | | | |
| | 12 | M | 3.3 | 123 | 1.66 | 40 | Ruptured at base metal | — |
| | | R | 2.6~4.1 | 120~139 | 0.90~1.80 | | | |

EXAMPLE 3

Electric welded steel pipes having an outside diameter of 273.1 mm and a thickness of 12.7 mm were prepared from the compositions shown in Table 5. These pipes were subjected to 6-layer, 6-pass circumferential welding conducted by the shielded metal arc welding method using cellulose type welding rods. As in the case of Example 1, the samples prepared by the method of the present invention in Example 3 were welded by varying the welding rod such that a cellulose type E 7010 welding rod (tensile strength 5.2 kg/mm$^2$) was used for forming the preceding or underlying weld layers while a cellulose type E 6010 welding rod (tensile strength 50.2 kg/mm$^2$) was used for forming the final layer. The circumferential welding was conducted to provide the same geometrical factors of the weld reinforcement as Example 2, i.e., a height H of 1.11 mm, toe angle α of 132° and toe radius of curvature r of 4.6 mm. Test pieces were extracted in the same size as Example 1 and were subjected to 10 cycles of repeated bending test conducted under the same conditions as Example 1 to determine the state of generation of cracks, the result being shown in Table 6.

Sample Nos. 8 to 16 shown in Table 5, prepared in accordance with the method of the present invention, showed almost no cracking. Sample Nos. 1 to 7 as comparison examples were prepared by using the same welding material for the final weld layer as those used for the preceding or underlying layers in conformity with the strengths of the base metals. Partly because of the fact that the final layer was formed of the same welding material as the preceding or underlying layers, and partly because of the reasons concerning compositions as described below, these samples Nos. 1 to 7 generally showed a large rate of generation of cracks. More specifically, Sample No. 1 showed a large rate of generation of cracks due to the fact that the C content and the welding crack sensitivity Pcm exceeded the upper limits of the respective ranges specified by the invention. In Sample Nos. 2, although the welding crack sensitivity Pcm is as small as 0.099, the value of the carbon equivalent Ceq is below the range specified by the invention to allow generation of a softened region in the heated affected zone, resulting in a crack generation rate which is as high as 34%. In Sample Nos. 3 and 4, high rates of crack generation were observed because the carbon equivalent Ceq and the welding crack sensitivity Pcm exceed the upper limits respectively. In Sample Nos. 5, 6 and 7 although the conditions concerning the welding crack sensitivity Pcm and the carbon equivalent Ceq are met, a large rate of crack generation was observed due to the fact that the total content (Nb + V + Ti) exceed the upper limit of the range specified by the invention.

The toe-crack prevention effect produced by the base metal composition of the invention alone was examined by way of reference.

Circumferential welding of 6-layer, 6-pass was conducted with a cellulose-type E 7010 Al welding rod on electric welded steel line pipes (outside diameter 273.1 mm, thickness 12.7 mm) having compositions shown in Table 7. Test pieces were obtained in the same manner as Example 1 and were subjected to the same bending test as Example 1 for examination of state of generation of cracks in the region around the weld portion, the results being shown in Table 8. Sample Nos. 4, 5 and 6 in Table 8 employed the base metal compositions which meet the ranges specified by the invention, but the circumferential welding was conducted under the same conditions both for the comparison examples shown as Sample Nos. 1, 2 and 3 in Table 8 and Sample Nos. 4, 5 and 6 employing the base metal compositions of the invention. It will be seen that Sample Nos. 4, 5 and 6 exhibit much smaller rates of generation of crack as compared with Sample Nos, 1, 2 and 3, by virtue of the use of the base metal compositions meeting the conditions specified by the invention, although the rates of crack generation exhibited by Sample Nos. 4, 5 and 6 are inferior to those of the samples of the invention shown in Example 3.

TABLE 5

| | No. | C | Si | Mn | P | S | Al | Cu | Ni | Cr | Mo | V | Nb | Ti | Ca | B |
|---|---|---|---|---|---|---|---|---|---|---|---|---|---|---|---|---|
| Comp. Ex. | 1 | 0.22 | 0.17 | 0.72 | 0.018 | 0.003 | 0.041 | 0.01 | 0.10 | 0.01 | — | 0.001 | 0.001 | 0.001 | — | — |
| | 2 | 0.05 | 0.16 | 0.55 | 0.018 | 0.003 | 0.040 | 0.01 | 0.28 | 0.14 | 0.01 | 0.030 | 0.008 | 0.001 | — | — |
| | 3 | 0.13 | 0.10 | 0.95 | 0.017 | 0.003 | 0.038 | 0.15 | 0.37 | 0.22 | — | 0.031 | 0.007 | 0.001 | — | — |
| | 4 | 0.20 | 0.30 | 0.62 | 0.018 | 0.003 | 0.040 | 0.15 | 0.10 | 0.10 | — | 0.020 | 0.003 | 0.001 | — | — |
| | 5 | 0.16 | 0.20 | 0.93 | 0.012 | 0.002 | 0.042 | 0.16 | 0.17 | 0.01 | — | 0.007 | 0.032 | 0.003 | 0.002 | — |
| | 6 | 0.06 | 0.10 | 0.77 | 0.018 | 0.006 | 0.025 | 0.01 | 0.10 | 0.02 | — | 0.018 | 0.023 | 0.002 | — | — |
| | 7 | 0.04 | 0.20 | 0.82 | 0.010 | 0.001 | 0.041 | 0.17 | 0.16 | 0.02 | — | 0.046 | 0.014 | 0.001 | 0.003 | 0.001 |
| Examples of Invention | 8 | 0.14 | 0.15 | 0.60 | 0.019 | 0.003 | 0.040 | 0.01 | 0.11 | 0.01 | — | 0.001 | 0.001 | 0.010 | 0.002 | — |
| | 9 | 0.14 | 0.18 | 0.64 | 0.013 | 0.002 | 0.038 | — | 0.11 | 0.02 | 0.02 | 0.001 | 0.002 | 0.004 | — | — |
| | 10 | 0.10 | 0.20 | 1.30 | 0.014 | 0.002 | 0.036 | 0.02 | 0.12 | — | 0.02 | 0.003 | 0.010 | 0.008 | 0.002 | — |
| | 11 | 0.10 | 0.16 | 0.62 | 0.018 | 0.003 | 0.022 | — | — | — | — | 0.003 | 0.012 | 0.001 | — | 0.0005 |
| | 12 | 0.11 | 0.19 | 0.63 | 0.015 | 0.003 | 0.036 | 0.05 | — | 0.02 | — | 0.004 | 0.009 | 0.009 | — | — |
| | 13 | 0.09 | 0.20 | 0.77 | 0.016 | 0.002 | 0.034 | 0.03 | — | — | — | 0.005 | 0.013 | 0.011 | 0.002 | — |
| | 14 | 0.11 | 0.20 | 1.28 | 0.014 | 0.002 | 0.036 | 0.02 | — | 0.06 | 0.09 | 0.018 | 0.003 | 0.014 | — | — |
| | 15 | 0.12 | 0.19 | 0.78 | 0.017 | 0.002 | 0.039 | 0.04 | — | 0.04 | 0.14 | 0.014 | 0.011 | 0.004 | 0.002 | — |
| | 16 | 0.10 | 0.16 | 0.62 | 0.018 | 0.003 | 0.022 | — | — | — | — | 0.003 | 0.012 | 0.001 | — | — |

TABLE 6

| | No. | Ceq. | Pcm | V + Nb + Ti (%) | Crackgen rate (%) | ΔHv |
|---|---|---|---|---|---|---|
| Comparison Examples | 1 | 0.350 | 0.264 | 0.003 | 8 | 7 |
| | 2 | 0.197 | 0.099 | 0.039 | 34 | 16 |
| | 3 | 0.373 | 0.209 | 0.039 | 9 | 7 |
| | 4 | 0.344 | 0.257 | 0.024 | 8 | 8 |
| | 5 | 0.340 | 0.225 | 0.042 | 21 | 11 |
| | 6 | 0.203 | 0.107 | 0.043 | 29 | 13 |
| | 7 | 0.212 | 0.109 | 0.061 | 43 | 18 |
| Examples of Invention | 8 | 0.250 | 0.178 | 0.012 | 1 | 6 |
| | 9 | 0.262 | 0.182 | 0.007 | 0 | 6 |
| | 10 | 0.331 | 0.176 | 0.021 | 0 | 5 |
| | 11 | 0.204 | 0.139 | 0.016 | 2 | 8 |
| | 12 | 0.223 | 0.152 | 0.022 | 1 | 6 |
| | 13 | 0.221 | 0.137 | 0.029 | 1 | 7 |
| | 14 | 0.358 | 0.192 | 0.035 | 0 | 6 |
| | 15 | 0.291 | 0.180 | 0.029 | 1 | 6 |
| | 16 | 0.204 | 0.137 | 0.016 | 1 | 7 |

TABLE 7

| | No. | C | Si | Mn | P | S | Al | Cu | Ni | Cr | Mo | V | Nb | Ti | Ca | B |
|---|---|---|---|---|---|---|---|---|---|---|---|---|---|---|---|---|
| Comp. Ex. | 1 | 0.05 | 0.16 | 0.55 | 0.018 | 0.003 | 0.040 | 0.01 | 0.28 | 0.14 | 0.01 | 0.030 | 0.008 | 0.001 | — | — |
| | 2 | 0.16 | 0.20 | 0.93 | 0.012 | 0.002 | 0.042 | 0.16 | 0.17 | 0.01 | — | 0.007 | 0.032 | 0.003 | 0.002 | — |
| | 3 | 0.04 | 0.20 | 0.82 | 0.010 | 0.001 | 0.041 | 0.17 | 0.16 | 0.02 | — | 0.046 | 0.014 | 0.001 | 0.003 | 0.001 |
| Examples of Invention | 4 | 0.10 | 0.16 | 0.62 | 0.018 | 0.003 | 0.022 | — | — | — | — | 0.003 | 0.012 | 0.001 | — | 0.0005 |
| | 5 | 0.11 | 0.19 | 0.63 | 0.015 | 0.003 | 0.036 | 0.05 | — | 0.02 | — | 0.004 | 0.009 | 0.009 | — | — |
| | 6 | 0.12 | 0.19 | 0.78 | 0.017 | 0.002 | 0.039 | 0.04 | — | 0.04 | 0.14 | 0.014 | 0.011 | 0.004 | 0.002 | — |

TABLE 8

| | No. | Ceq. | Pcm | V + Nb + Ti (%) | Crackgen rate (%) | ΔHv |
|---|---|---|---|---|---|---|
| Comparison Examples | 1 | 0.197 | 0.099 | 0.039 | 34 | 16 |
| | 2 | 0.340 | 0.225 | 0.042 | 21 | 11 |
| | 3 | 0.212 | 0.109 | 0.061 | 43 | 18 |
| Examples of Invention | 4 | 0.204 | 0.139 | 0.016 | 6 | 8 |
| | 5 | 0.223 | 0.152 | 0.022 | 6 | 6 |
| | 6 | 0.291 | 0.180 | 0.029 | 5 | 6 |

What is claimed is:

1. A circumferential welding method for an electric-welded pipe to be laid by a reel barge, comprising the steps of:
   (a) hot-rolling a steel having the following components:
   C: 0.03 to 0.20 wt%;
   Mn: 0.50 to 1.5 wt%;
   Si: 0.05 to 0.50 wt%;
   Al: 0.005 to 0.060 wt%
   Nb + V + Ti: not more than 0.040 wt% and the balance substantially Fe and incidental inclusions,
   said steel having a carbon equivalent Ceq not less than 0.20 but not more than 0.36 and a welding crack sensitivity Pcm not more than 0.25, said carbon equivalent Ceq and said welding crack sensitivity Pcm being expressed by the following formula:

$Ceq = C + Mn/6 + Cu/15 + Ni/15 + Cr/5 + Mo/5 + V/5$ $Pcm = C + Si/30 + Mn/20 + Cu/20 + Ni/60 + Cr/20 + Mo/15 + V/10 + 5B$ (b) forming said hotroller steel into a pipe by electric resistance welding; and
   (c) connecting a plurality of said pipes by a multi-layer butt circumferential welding wherein a final layer welding of said multi-layer welding is formed by a welding material having a strength which is at least 5 kg/mm² lower than a welding material which forms layer welding up to a layer immediately under said final layer.

2. The method according to claim 1, wherein a reinforcement of weld is formed to meet the following conditions:
   2 mm ≦ radius of curvature at a toe of weld
   120° ≦ angle of said toe of weld
   0.8 mm ≦ height of said reinforcement of weld ≦ 1.8 mm.

3. The method according to claim 1, wherein said steel further comprises at least one element selected from the group consisting of:
   Ni: not more than 0.50 wt%
   Cu: not more than 0.50 wt%

Ca: not more than 0.005 wt%

Cr: not more than 0.3 wt%.

4. The method according to claim 3, wherein said steel further comprises at least one element selected from the group consisting of:

Mo: not more than 0.30 wt%

B: not more than 0.002 wt%.

5. The method according to claim 1, wherein said steel further comprises at least one element selected from the group consisting of:

Mo: not more than 0.30 wt%

B: not more than 0.002 wt%.

* * * * *